Figure 1:
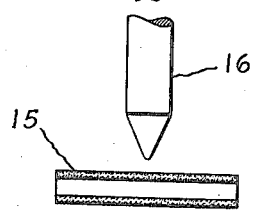

A. L. R. ELLIS.
PIVOT AND JEWEL FOR MEASURING INSTRUMENTS.
APPLICATION FILED MAY 17, 1915.

1,208,526.

Patented Dec. 12, 1916.

Inventor:
Alvarado L.R. Ellis,
by
His Attorney.

UNITED STATES PATENT OFFICE.

ALVARADO L. R. ELLIS, OF LYNN, MASSACHUSETTS, ASSIGNOR TO GENERAL ELECTRIC COMPANY, A CORPORATION OF NEW YORK.

PIVOT AND JEWEL FOR MEASURING INSTRUMENTS.

1,208,526.

Specification of Letters Patent.  Patented Dec. 12, 1916.

Application filed May 17, 1915. Serial No. 28,542.

*To all whom it may concern:*

Be it known that I, ALVARADO L. R. ELLIS, a citizen of the United States, residing at Lynn, in the county of Essex, State of Massachusetts, have invented certain new and useful Improvements in Pivots and Jewels for Measuring Instruments, of which the following is a specification.

My invention relates to the pivots and jewels for measuring instruments and particularly for electrical measuring instruments.

The movable element of an electrical measuring instrument is generally provided with glass-hard steel pivots mounted in the ends of the shaft of the element, and is operatively positioned in jewels of sapphire or other material of equivalent characteristics. The pivots may be, and usually are, mainly shaped in grinding machines, but the bearing area of the pivot has heretofore been finished by hand. To effect the finishing of the pivot, it is placed in the chuck of a suitable lathe and the point rounded by a hand implement. This manual finishing operation is uncertain in its results, due among other reasons to the very brittle character of glass-hard steel, and is, furthermore, relatively expensive, and again, since the personal equation of the operator enters very largely into the operation, the product is by no means uniform.

The principal object of my present invention is to provide a novel and improved method of rounding the bearing point or area of an instrument pivot, and in particular a glass-hard steel pivot, and more generally of finishing the bearing area of an instrument bearing part.

Another object of the invention is to provide a novel and improved "jewel" for measuring instruments, and also a novel method of making the same.

Other objects of the invention will be noted hereinafter.

The novel features which I believe to be patentably characteristic of my invention are definitely indicated in the claims appended hereto.

The principle of the invention, its mode of operation and its application will be understood from the following description taken in connection with the accompanying drawings, in which:

Figures 1 to 6 inclusive are diagrammatic explanatory views representing various steps in the novel and improved methods of my present invention; Figs. 7, 8, 9 and 10 are diagrammatic views representing certain features of my novel and improved method of making instrument "jewels"; and Figs. 11 and 12 are diagrammatic explanatory views.

The pivot generally employed in an electrical measuring instrument is about .125 of an inch in length and is usually machine-ground into the proper shape from a glass-hard steel rod of about .018 to .045 of an inch in diameter. In the finishing operation the bearing area of the pivot is rounded by a hand implement so that the rounded area has a radius of approximately .0005 of an inch. The rounded portion of the pivot which is actually useful in an instrument is confined to an area a little smaller than one millionth of a square inch. This area seems to be not very different for widely varying curves of jewel and pivot. This latter conclusion is drawn from actual friction-tests made with a jewel and pivot, where the jewel had a cup of approximately .125 of an inch radius and a pivot of .010 or .011 of an inch radius, and jewel and pivot, where the pivot had a radius of .0005 of an inch and the jewel in contact therewith had approximately .125 of an inch radius.

Glass-hard steel, as is well understood in the art, is steel that has been tempered until it is hard enough to scratch glass. Steel which has been tempered glass-hard is very brittle, and is generally considered too hard to be "cold-worked". I have found that if a rounded glass-hard steel pivot is placed upon a piece of brass and given a sharp tap it will make a small indentation or prick-mark in the brass, but a microscopic examination of the pivot will show that the point is uninjured. This same phenomenon is observed if a piece of iron or bronze is substituted for the piece of brass. If, however, the pivot is only slightly pressed against a sapphire jewel, the rounded point of the pivot will be found upon a microscopic examination to be greatly distorted or pressed out of shape.

Figure 11:
Figure 12:

Figs. 11 and 12 of the drawings indicate on an enlarged scale the distorted appearance of hardened-steel pivot points that have been pressed against a sapphire jewel. The pivot of Fig. 11 was pressed directly against the sapphire surface, while the pivot of Fig. 12 was given a slight lateral pressure against the sapphire surface. It will be understood that the force applied to the pivot when in contact with the sapphire jewel is in no sense excessive, and is merely that force obtained by pressing the pivot against the jewel with one's fingers. The conclusions to be drawn from these observations is that a glass-hard steel pivot can be given a sharp tap when in contact with an object of softer material, such as iron, bronze, brass, or the like, without injuring its bearing point, but can be given very little pressure against an object of harder material, such as sapphire, without distorting the shape of the bearing portion of the pivot.

My present invention is based upon the foregoing observations, which I believe to have been first made by me. If a sharpened pivot point of glass-hard steel is pressed against a flat sapphire surface it will be permanently deformed. If such a sharpened pivot point is pressed into a sapphire matrix conforming to the desired configuration of a finished rounded-point pivot, the sharpened pivot point will be forced at its end into the exact configuration of the matrix, and a very slight pressure will serve to satisfactorily round the pivot point. This is, in substance, the method of rounding instrument pivot points of my present invention, and may be briefly described as the operation of pressing the pivot point into a suitably shaped matrix of a material harder than the material of the pivot.

Contrary to what might be expected, in view of the well known brittle character of glass-hard steel, the point of the pivot is not chipped or broken when pressed into a suitably shaped matrix of a material harder than glass-hard steel, but on the contrary the metal of the pivot appears to easily flow, upon the application of a slight force, into its new configuration, as determined by the matrix. Of course it will be understood from the dimensions hereinbefore mentioned that the changes in the configuration of the pivot point by the rounding operation are very slight, but, as far as I am aware, it has not heretofore been known that a glass-hard steel pivot could be "cold-worked" to even this extent. The steel used for cutting edges is made quite soft in order to prevent chipping, since if too hard it is very brittle, and, similarly, steel which is to be "cold-worked" must be quite soft.

My invention involves the "cold-working" of steel tempered glass-hard, and may aptly be said to involve the cold molding of glass-hard steel.

Figure 2:
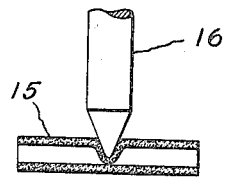
Figure 3:
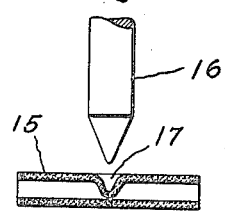
Figure 4:
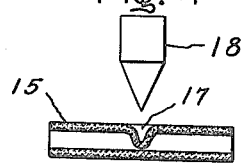
Figure 5:
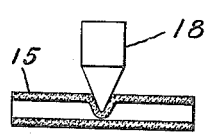
Figure 6:
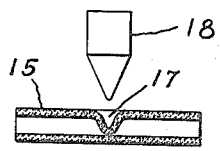

In the accompanying drawings, Figs. 1, 2 and 3 illustrate diagrammatically the steps in the method of forming the matrix, and Figs. 4, 5 and 6 the steps in the method of rounding the pivot point.

It will be obvious that sapphire is not in all respects the best material for the matrix, first, because of its cost, and, second, because of the difficulty in shaping the matrix. Quartz is harder than glass-hard steel, and because of its cheapness and its adaptability to be suitably shaped lends itself admirably to the purposes of my present invention.

In Fig. 1 of the drawings there is represented a quartz tube 15 and a die or shaper 16 having at its end the exact rounded configuration which it is desired a finished instrument pivot should have. The quartz tube is heated until it becomes plastic, and the die 16 is then pressed into the plastic portion of the tube, as represented in Fig. 2. When this plastic portion of the quartz tube becomes sufficiently rigid to preserve the configuration imparted thereto by the die 16, the die is withdrawn from the tube leaving a depression 17 of substantially the same configuration as the corresponding portion of the die 16, and this depression constitutes the matrix to be used in my novel method of rounding instrument pivots.

In Fig. 4, an unfinished instrument pivot 18 is represented in position above the matrix 17. The pivot 18 has merely been shaped in the usual grinding machine and its point is relatively sharp. In finishing the pivot, the sharpened point is rounded in accordance with my present invention. The pivot 18 is pressed into the matrix 17, as represented in Fig. 5, and preferably is given a slight rotary movement. The pressure required in the operation is no more than can be easily applied by the operator's fingers. When the pivot has been withdrawn from the matrix, its point will be found to have been rounded, as represented in Fig. 6 of the drawings. In order to prevent unnecessary friction, which ruins the surface of the matrix by scratching, I employ a lubricant, such as oil, glycerin, or even water, during the rounding operation.

In the foregoing description I have referred to the pressure which is necessary to round the pivot point as comparatively slight, and in order to give some idea of the magnitude of this pressure have defined it as no greater than can be conveniently exerted by forcing the pivot point into the matrix with one's fingers. It will be obvious that I do not wish to be understood to say that in the actual practice of my invention the pivot point is rounded by hand, for it will be understood that a far more uniform product is obtained by placing the pivot in a machine and forcing it into the matrix by the application of the necessary pressure to effect the desired finishing or rounding of the pivot point. It will, furthermore, be understood, that a solid piece of quartz may be, and preferably is, used instead of the quartz tube.

Figure 7:
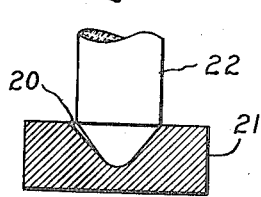
Figure 8:
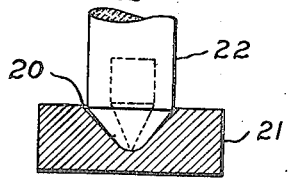

From the observations hereinbefore recorded, it would appear that where the weight of the movable element of an electrical measuring instrument is very appreciable the bearing area of a hardened-steel pivot is very likely to be distorted where a jewel of the hardness of quartz or sapphire is employed. These observations, furthermore, indicate that a metal "jewel" of approximately the same hardness as the pivot can be satisfactorily employed in electrical measuring instruments. I have found that a "jewel" made of steel can be very satisfactorily employed in connection with a steel pivot, and also in connection with a bronze pivot. The method of my present invention can be very satisfactorily and conveniently employed in giving such a "jewel" the proper configuration and smooth polished surface at the bearing area. This feature of my invention is represented in Figs. 7 and 8 of the drawings. In these figures a recess 20 is formed in any suitable manner in a metallic block 21. The material of the block 21 is chosen with due consideration to the characteristics of the particular instrument in question, and may be glass-hard steel, bronze, or the like. A die or shaper 22 having at its end a rounded portion, conforming exactly to the configuration that it is desired the finished "jewel" should have at its bearing area, is forced against the bottom of the recess 20 at the point where the bearing surface of the "jewel" should be located. The die 22 is of a material relatively harder than the material of the block 21. In practice, the die is placed in the desired position with respect to the recess 20 and given a sharp blow. Such an operation is found to suitably finish the bearing surface of the "jewel", so that the area in contact with the instrument pivot is properly polished.

In Fig. 7, the die 22 is shown as resting in the unfinished recess 20 ready to be acted upon by the necessary force to properly shape and finish the bearing area of the "jewel".

In Fig. 8, the die is represented after the application of the operating force which results in suitably shaping the bottom of the recess 20 and in polishing the bearing area required for the coöperating instrument pivot, such as represented in dotted lines. A "jewel" having a bearing surface of a hardness comparable to that of sapphire can be very conveniently made in accordance with my present invention.

Figure 9:
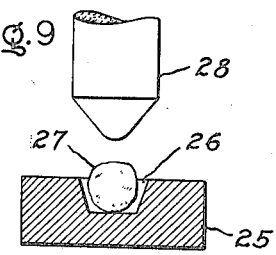
Figure 10:
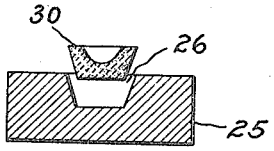

In Fig. 9 of the drawings there is represented a block 25 of a suitable material, for example carbon, which will withstand considerable heat. The block 25 has a recess 26 in which is placed a bead 27 of quartz, glass, or other fusible material of satisfactory hardness. The block 25 and the bead 27 are heated until the quartz becomes plastic, when a shaper 28 is forced into the plastic mass resulting in a perfectly formed "jewel". It will of course be understood that the die 28 is shaped to produce exactly the desired configuration of the bearing surface of the "jewel" when pressed into the plastic bead 27. It will be observed that this method of making the "jewel" is analogous to the method of making the matrix for rounding the pivot points heretofore described. The recess 26 has a tapered wall so that the finished "jewel" 30 can be withdrawn, as illustrated in Fig. 10 of the drawings. A "jewel" formed of quartz, glass, or other similar vitreous material of satisfactory hardness in accordance with my present invention is easily given the desired configuration and has inherently a highly polished surface such as is desired in pivot "jewels".

My improved "jewel" and the method of making the same form the subject-matter of my copending application filed Oct. 26, 1916, Ser. No. 127,817.

What I claim as new and desire to secure by Letters Patent of the United States, is:—

1. The method of rounding an instrument pivot point of glass-hard steel which consists in forming a matrix of a fusible material harder than glass-hard steel by heating a mass of such material until plastic and then forcing a shaper of the same configuration as the desired rounded pivot point into the plastic mass, and pressing the pivot point to be rounded into the matrix so formed.

2. The method of rounding an instrument pivot point of glass-hard steel which consists in forming a matrix of vitreous material harder than glass-hard steel by heating a mass of such material until plastic and then forcing a shaper of the same configuration as the desired rounded pivot point into the plastic mass, and pressing the pivot point to be rounded into the matrix so formed.

3. The method of rounding an instrument pivot point of glass-hard steel which consists in pressing the pivot point into a matrix of a material harder than glass-hard steel.

4. The method of rounding an instrument pivot point of glass-hard steel which consists in pressing the pivot point into a matrix of a vitreous material harder than glass-hard steel.

5. The method of rounding an instrument pivot point of glass-hard steel which consists in forcing the pivot point under slight pressure and accompanied with a slight rotary movement into a matrix of a material harder than glass-hard steel.

6. The method of forming a cast having a configuration conforming to that of an instrument bearing part which consists in heating a mass of fusible material until plastic, forcing a shaper having a configuration conforming to that of the desired instrument bearing part into the plastic mass, and withdrawing the shaper when the mass has become sufficiently rigid to preserve the configuration imparted thereto by the shaper.

7. The method of finishing the bearing area of an instrument bearing part of glass-hard steel which has previously been given the general desired configuration of the finished part which consists in forcing the bearing area of the part into contact with a member of a material harder than glass-hard steel and having a configuration conforming to that which it is desired the finished bearing area of the part of glass-hard steel should have.

8. The method of finishing the bearing area of an instrument bearing part of glass-hard steel which has previously been given the general desired configuration of the finished part which consists in forcing the bearing area of the part into contact with a member of fusible vitreous material having a configuration conforming to that which it is desired the finished bearing area of the part of glass-hard steel should have.

9. The method of finishing the bearing area of a glass-hard steel instrument pivot which has previously been given the general desired configuration of the finished pivot which consists in forcing the bearing area of the pivot into contact with a member of a material harder than glass-hard steel and having a configuration conforming to that which it is desired the finished bearing area of the glass-hard steel pivot should have.

10. The method of finishing the bearing area of a metallic instrument pivot which has previously been given the general desired configuration of the finished pivot which consists in forcing the bearing area of the pivot into contact with a member of a material harder than that of the pivot and having a configuration conforming to that which it is desired the finished bearing area of the metallic pivot should have.

11. The method of finishing the bearing area of a metallic instrument bearing part which has previously been given the general desired configuration of the finished part which consists in forcing the bearing area of the part into contact with a member of a material harder than that of the metallic part and having a configuration conforming to that which it is desired the finished bearing area of the metallic part should have.

12. The method of finishing the bearing area of a glass-hard steel instrument pivot which has previously been given the general desired configuration of the finished pivot which consists in heating until plastic a mass of fusible material harder than glass-hard steel, forcing into the plastic mass a shaper having a configuration conforming to that which it is desired the finished bearing area of the glass-hard steel pivot should have, withdrawing the shaper when the mass has become sufficiently rigid to preserve the configuration imparted thereto by the shaper whereby a matrix is formed in the mass, and forcing the bearing area of the glass-hard steel pivot into the matrix so formed.

In witness whereof, I have hereunto set my hand this 13th day of May 1915.

ALVARADO L. R. ELLIS.